(12) United States Patent
Feller

(10) Patent No.: US 7,703,337 B1
(45) Date of Patent: Apr. 27, 2010

(54) CLAMPING ARRANGEMENTS FOR A TRANSDUCER ASSEMBLY HAVING A PIEZOELECTRIC ELEMENT WITHIN A FOAM BODY

(76) Inventor: Murray F Feller, 21577 NW. 75th Avenue Rd., Micanopy, FL (US) 32677

( * ) Notice: Subject to any disclaimer, the term of this patent is extended or adjusted under 35 U.S.C. 154(b) by 0 days.

(21) Appl. No.: 12/408,677

(22) Filed: Mar. 21, 2009

Related U.S. Application Data

(63) Continuation-in-part of application No. 12/394,111, filed on Feb. 27, 2009, now Pat. No. 7,669,483.

(51) Int. Cl.
*G01F 1/66* (2006.01)
(52) U.S. Cl. .................................................. 73/861.27
(58) Field of Classification Search ....................... None
See application file for complete search history.

(56) References Cited

U.S. PATENT DOCUMENTS

| | | | | |
|---|---|---|---|---|
| 3,580,092 A | * | 5/1971 | Scarpa | 73/861.18 |
| 3,987,674 A | * | 10/1976 | Baumoel | 73/861.28 |
| 4,130,018 A | * | 12/1978 | Adams et al. | 73/290 V |
| 4,184,094 A | * | 1/1980 | Kopel | 310/335 |
| 4,326,274 A | * | 4/1982 | Hotta et al. | 367/118 |
| 4,333,352 A | * | 6/1982 | Connery et al. | 73/861.18 |
| 4,523,122 A | * | 6/1985 | Tone et al. | 310/334 |
| 4,735,097 A | * | 4/1988 | Lynnworth | 73/861.28 |
| 4,838,127 A | * | 6/1989 | Herremans et al. | 73/861.28 |
| 5,214,343 A | * | 5/1993 | Baumoel | 310/334 |
| 5,463,905 A | * | 11/1995 | Baird | 73/861.25 |
| 5,664,456 A | * | 9/1997 | Eckert | 73/290 V |
| 6,563,254 B2 | | 5/2003 | Perkins et al. | |
| 6,781,287 B1 | * | 8/2004 | Dam et al. | 310/334 |
| 7,000,485 B2 | * | 2/2006 | Ao et al. | 73/861.29 |
| 7,288,878 B1 | | 10/2007 | Feller | |

* cited by examiner

*Primary Examiner*—Harshad Patel
(74) *Attorney, Agent, or Firm*—David Kiewit

(57) ABSTRACT

A clamp-on acoustic flow meter for measuring the rate of flow of a fluid in a pipe uses a transducer stack mounted in a housing that includes a rigid polymeric foam body in which the stack is embedded. This transducer configuration is used in combination with a clamping mechanism operable to supply a clamping force directed substantially entirely along a radius of the pipe for clamping the exposed portion of a transducer stack end piece to the pipe.

9 Claims, 2 Drawing Sheets

CLAMPING ARRANGEMENTS FOR A TRANSDUCER ASSEMBLY HAVING A PIEZOELECTRIC ELEMENT WITHIN A FOAM BODY

RELATION TO OTHER APPLICATIONS

This application is a continuation-in-part of the inventor's U.S. patent application having Ser. No. 12/394,111, filed on Feb. 27, 2009.

BACKGROUND OF THE INVENTION

1. Field of the Invention

The present invention relates to acoustic transducer apparatus and methods for measuring a rate of flow of a fluid through a pipe. More specifically, the invention relates to arrangements in which ultrasonic transducers, mounted in housings, are clamped to an external surface of the pipe.

2. Background Information

Transit time flow meters used to measure the rate of flow of fluids through a pipe commonly employ clamp-on transducers attached against an external surface of the pipe. One of the problems associated with clamp-on transducers is that the transducer housing may move or even become unclamped from the pipe at some time during its installed life. Pipe vibration and operation at extreme temperatures both increase the risk of a mounting failure.

This risk is further increased when the transducer is not mounted either on the top or bottom of a horizontal pipe because of gravitational forces tending to make the transducer fall off the pipe. Sometimes these angled mounting arrangements are selected because of physical access considerations. In other installations a transducer is mounted at some angle away from the top of the pipe to avoid the ultrasonic beam having to contend with air or gas bubbles.

Regardless of the clamping method used to hold a transducer against a pipe, the risk of mounting failure increases with increasing weight of the transducer and its housing. Thus, there is a need for transducer housings having a minimum realizable density.

Current art clamp-on transducers commonly employ liquid or gel acoustic coupling promoters, such as silicone greases. Because these coupling promoters tend to evaporate, wick away or otherwise degrade or leave the area over a period of time, the transducer mounting may require frequent maintenance. Thus there is a need for improvement in materials selected for coupling a transducer to a pipe.

BRIEF SUMMARY OF THE INVENTION

One aspect of the invention is that it provides an improved acoustic flow meter for measuring the rate of flow of a fluid in a pipe. This flow meter comprises a transducer stack, a housing, and a clamping mechanism bearing on the housing and operable to supply a clamping force directed substantially entirely along a radius of the pipe for clamping the exposed portion of a transducer stack end piece to the pipe. The housing provides a polymeric foam mounting and support for the stack. It may have a hard outer shell that surrounds components that are not immediately adjacent the pipe.

Another aspect of the invention is that it provides a method of attaching an acoustic transducer portion of a flowmeter to an external surface of a pipe in which the flow of a fluid is to be measured. In this regard, the transducer comprises at least a piezoelectric transducer element and an end piece, where the stack is embedded in a polymeric foam body so as to leave a portion of the end piece exposed at one surface of that body. The exposed portion of the end piece may be machined to form a concave cylindrical surface having a radius of curvature substantially equal to the radius of the pipe to which the transducer is to be attached. An adhesive film is preferably then pressed onto the concave surface of the end piece and the adhesive-coated end piece surface is pressed against an external surface of the pipe. In a particular preferred method, the adhesive film is pressed against the edge of the concave end piece surface so as to cut away those portions of the film not adhering directly to the end piece.

As described in a parent application, another aspect of the invention is that it provides an acoustic flowmeter for measuring flow of fluid along an axis of a ferromagnetic pipe, where the flowmeter comprises an ultrasonic transducer disposed within a housing clamped to an external surface of the pipe by a magnetic clamping mechanism. In preferred embodiments the magnetic clamping mechanism can comprise a pair of permanent magnets juxtaposed about the housing. In addition, there may be a yoke extending between the two magnets so as to impose a clamping force directed substantially entirely along a selected radius of the pipe for clamping the transducer housing to the pipe Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

Figure 1:
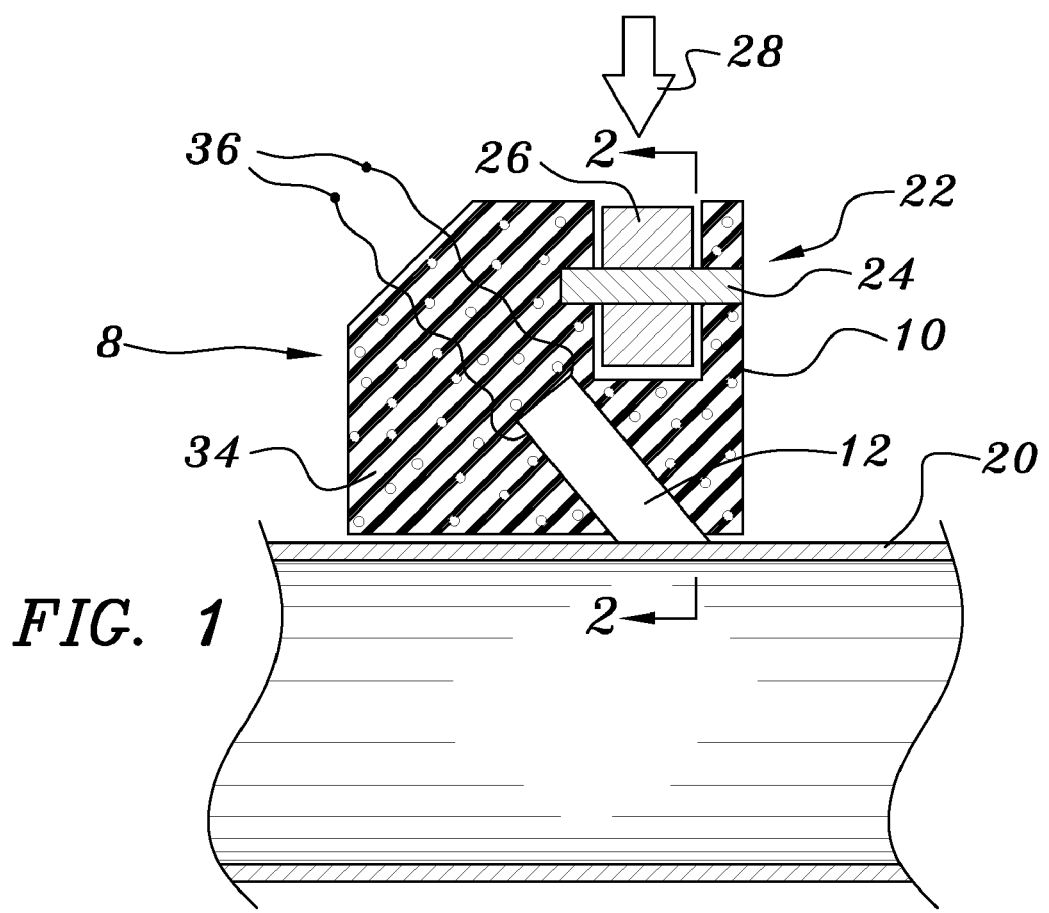
FIG. 1 is a partial sectional view, taken along an axis of a pipe, of an acoustic transducer of the invention mounted on the pipe.
Figure 2:
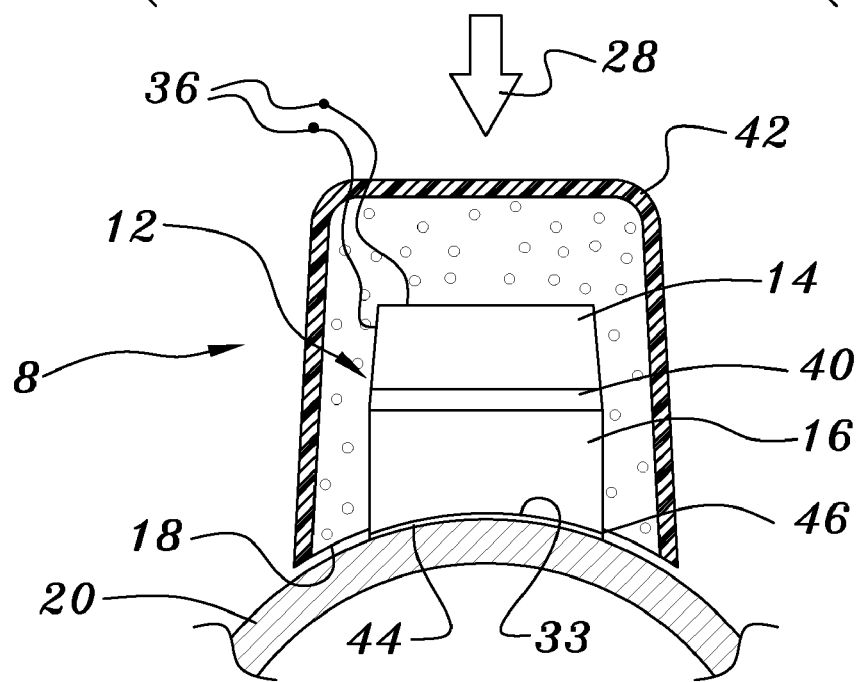
FIG. 2 is a partly cut-away, partly cross-sectional view of a transducer similar to that of FIG. 1, the section taken as indicated by the arrow 2-2 in FIG. 1.

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases.

The skilled reader will appreciate that the term 'transducer' is used in the acoustic flow measurement art to denote either an electro-mechanical element (e.g., a poled piezoelectric ceramic wafer) or an apparatus comprising one or more such elements, combined with resonators, coupling members, etc., and disposed within a housing. To alleviate such ambiguity, this description will refer to the minimal electro-mechanical element as a 'transducer element'; will use the term "transducer stack" to stand for a sub-assembly comprising a transducer element along with other elements, such as an impedance matching stub, an end piece, electrical leads, etc.; and will use the term "transducer" 8 to stand for an assembly comprising a transducer stack and housing.

A transducer housing 10 may be of any of a wide range of designs, but is generally configured to hold a conventional transducer stack 12 comprising a piezoelectric element 14 bonded to various other elements, one of which is an end piece or coupling member 16 disposed at or below a selected surface 18 of the housing and curved to conform to the outside of the pipe 20. This arrangement can provide a short acoustic transmission path that is mechanically stable. The skilled reader will appreciate that inasmuch as the transducer is firmly mounted or embedded within a housing, arrangements for clamping the housing to a pipe also clamp the transducer coupling member and the rest of the transducer stack to the pipe. Thus, the ensuing discussion sometimes refers to clamping a transducer and sometimes refers to clamping a housing.

Many prior art clamping arrangements use a tensioning screw and a clamp band (not shown) that can slide along the top of the transducer housing. In these cases friction between the clamp band and the transducer housing creates a torque tending to tip the transducer housing. This can result in uneven mounting pressures which can lead to mechanical instability and a high reliance on coupling promoters.

One approach to overcoming the frictional issue is to provide a slippery surface portion on at least a portion of the transducer housing 10 distal from the pipe 20. This surface is characterized by a sufficiently low coefficient of friction as to substantially prohibit the clamp band from applying a force component directed tangential to the pipe.

Another approach, as depicted in FIG. 1, is to provide a low friction rotary bearing arrangement 22 incorporated in the transducer housing 10 and abutting the clamp band (not shown). The bearing arrangement 22 comprises a shaft 24 journaled within a portion of the housing and, in some embodiments, a drum portion 26 extending outward from the shaft. A bearing arrangement of this sort is operable to remove substantially all of the forces applied tangential to the pipe and to thereby supply a clamping force that is substantially entirely directed along the radius of the pipe that extends through the bearing shaft as indicated by the large arrowhead 28.

Figure 3:
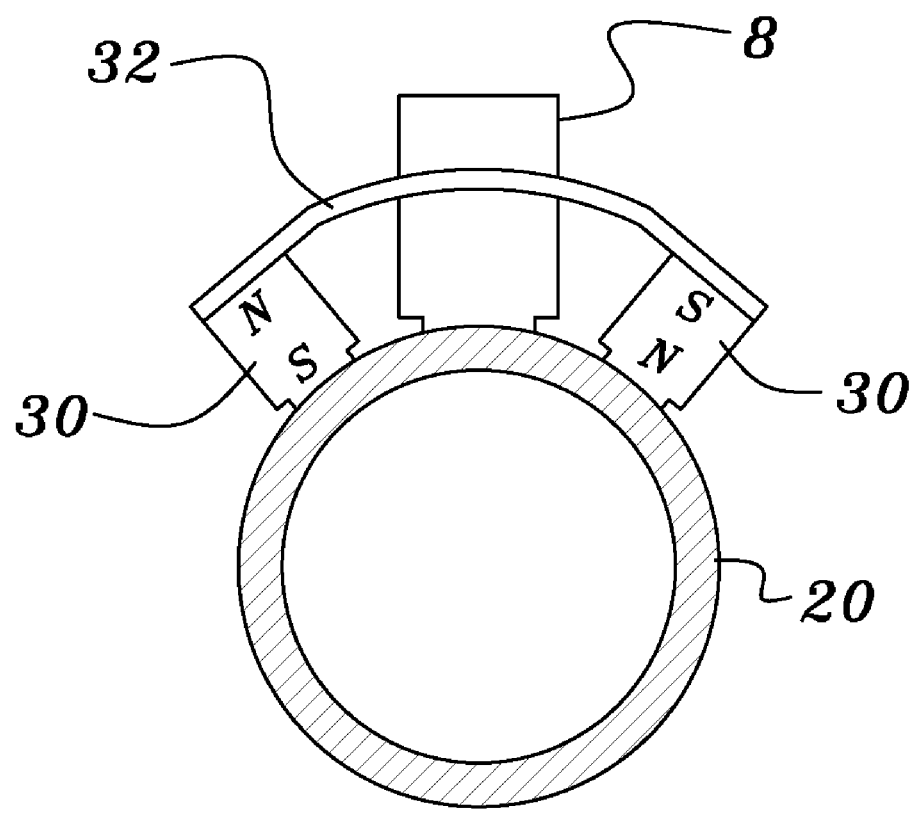
FIG. 3 is an elevational view of a transducer of the invention clamped to a pipe by means of a pair of magnets and a yoke.

Yet another approach, depicted in FIG. 3, is applicable to measuring flow through ferromagnetic pipes This approach uses pairs of high strength magnets 30 juxtaposed about a transducer housing 10 and coupled to the housing by a suitable means such as a yoke 32.

Because these improved clamping arrangements remove nearly all the tangential torque component from affecting the transducer, the attachment is relatively stable. Hence, the transducer contact area 33, through which the passage of acoustic energy occurs, can be reduced. This allows one to make a transducer housing that is narrower and taller than is found in the prior art.

As noted above, one concern in clamp-on transducers is that of the transducer moving along the pipe under the influence of gravity. To reduce the risk, the complete transducer should be of the lowest possible mass consistent with providing the needed strength. In a preferred embodiment, the transducer housing is made of a rigid closed cell polymeric foam 34. Such foam materials are produced by General Plastics Manufacturing Company as in their Last-A Foam® FR-3700 product line. At a density of as little as 8 pounds per cubic foot, the foam is relatively strong even at high temperature, having a compressive strength of about 100 PSI at 250 degrees F.

The foam 34 can be molded around a transducer stack 12, or the stack can be cemented into a hole made in a foam body. Typically, the transducer stack, comprising the transducer element and associated components such as perforated mesh electrodes or soldered electrical connections 36, and an aluminum impedance matching stub 40, would be preassembled and then cast or cemented into the foam body. The skilled reader will appreciate that many other sorts of transducer stacking arrangements are known in the art and include, without limitation, the resonant stacking arrangement taught by the inventor in his U.S. Pat. No. 7,288,878.

The stack end piece 16, which conveys the acoustic energy between the transducer element and the pipe may be secure enough in the housing to allow light machine cuts to be made on it in order to define a surface shape of the transducer contact surface 33 for mating with the pipe 20. In situations where such machining is not practical because insufficient support is provided by the housing, a thin metal U-shaped bracket (not shown) with a hole closely fitting the end piece could be temporarily or permanently attached to the housing to provide adequate support. If the bracket is permanently attached or is actually part of an outer enclosure, such as a drawn metal shell containing the foam, the bracket may incorporate holes to inhibit acoustic reflections within the bracket. The area of metal surrounding the end piece may also be removed by cutting, etching or ablating after the piece has been shaped to fit the pipe order to inhibit acoustic connections between the metal and the end piece. Alternately, the piece 16 may be formed by itself with the shape for mating with the pipe, and then connected to the remainder of the stack either before or after that remainder is placed in the foam body.

In addition to the advantage afforded by its low mass, the foam 34 reduces internal acoustic reflections within the housing 10 so that these sources of interfering signals tend to be relatively low compared to equivalent housings made of solid materials. This enables relatively weak received acoustic signals to be used for providing reliable measurements.

The preferred rigid foam 34 can be formed inside a cavity, such as a hard shell 42 drawn, machined, or otherwise formed from a suitable material such as a hard plastic or aluminum. Alternately, a preformed block of the foam 34 could be cemented into a shell 42 or cavity. In either event, the hard shell 42 could supply support to the foam during a subsequent machining operation on the end piece 16 to match the pipe curvature.

It is noted that the foam 34 enables the transducer 8 to operate with relatively low self generated noise and as such, is favored for applications where the same transducer is used to first transmit acoustic energy and then almost immediately afterwards, to receive acoustic energy. This operational arrangement is sometimes used with transit-time sensing flow meters in which acoustically paired transducers spaced apart along the fluid flow axis transmit and receive at the same time. In these instruments the difference in the received acoustic signal transit times is derived to provide an indication of flow rate.

A preferred embodiment of the invention further comprises the use of a dry coupling agent 44 that does not harden. Generally speaking, materials that are conventionally used to couple a clamped-on acoustic transducer to a pipe are wet to a certain extent (i.e., are liquids or gels) or are permanently hardened materials, such as epoxies.

In the presently preferred embodiments an adhesive transfer tape is employed as a dry coupling agent 44. A particularly preferred tape is a thin, transparent acrylic tape sold by the 3M Corporation under the trade name of "Scotch VHB", where the 5 and 10 mil thicknesses are preferred for the transducer mounting application. The tape is rather soft, conformable and void free. If a mounting mistake is made, the tape can be scraped off with a fingernail or rolled off with the finger and a new piece of tape applied. This is much less messy than dealing with fluids, however viscous they may be, and no cleanup is required.

The preferred transfer tape is supplied with a paper release liner (not shown). In applying the dry coupling agent layer, the tape may be die cut to the size of the transducer mounting surface and mounted to the transducer. When the transducer is to be mounted on a pipe, the remaining liner is removed to expose the second adhesive surface. The transducer is then positioned on the pipe and pressed firmly to the pipe to establish adhesion.

If the transducer stack end piece 16 is machined to fit the pipe and a sharp edge formed during the cutting process is left in place, this edge 46 provides a convenient means for cutting the transfer adhesive to the exact size of the active face of the transducer stack end piece 33. This operation is similar to die cutting the transfer film, but uses the edge of the end piece as the die. In this case, a larger piece of the adhesive having a removable liner can be pressed onto the end piece mating surface and squeezed against the edge (e.g. by an installer's finger nail or by using a hard, smooth tool surface) to cut the transfer film. The unused transfer film can then be peeled away, leaving the release liner attached to the remaining transfer film until the transducer housing is ready to be placed on the pipe.

The transfer film can also be made with an opening (generally centered and taking up most of the mounting area) so as to act as a resilient containment or barrier for a conventional coupling agent placed in the opening prior to transducer mounting. This arrangement enables the film area supporting the transducer to be relatively small so that when external transducer clamping pressure is applied, the transducer and pipe mating surfaces can come closer together or even make contact at high spots, thereby reducing acoustic losses. Even if the coupling agent eventually looses effectiveness, the film will continue to provide some amount of acoustic transfer and can enable the meter to continue to function, although at some reduction in performance.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. An acoustic flow meter for measuring the rate of flow of a fluid in a pipe, the flow meter comprising:
   a transducer stack comprising a piezoelectric element and an end piece, the transducer stack disposed within a polymeric foam body so that a portion of the end piece is exposed at and extends beyond a surface of the foam body, the exposed portion of the end piece having a concave surface curved to fit against an external surface of the pipe;
   a dry coupling agent interposed between the exposed portion of the end piece and the pipe; and
   a clamp bearing on the body and operable to supply a clamping force directed substantially entirely along a radius of the pipe for clamping the exposed portion of the end piece to the pipe.

2. The flow meter of claim 1 wherein the dry coupling agent comprises an acrylic transfer tape.

3. The flow meter of claim 1 wherein the dry coupling agent comprises a solid adhesive sheet.

4. The flow meter of claim 1 wherein the exposed portion of the end piece comprises a sharp edge for cutting the dry coupling agent.

5. A method of attaching an acoustic transducer portion of a flowmeter to an external surface of a pipe in which the flow of a fluid is to be measured, the pipe having a selected external radius, the method comprising the steps of:
   a) providing a transducer stack comprising at least a piezoelectric transducer element and an end piece;
   b) embedding the transducer stack in a polymeric foam body so that a portion of the end piece protrudes beyond a surface of the body;
   c) forming, on the end piece, a concave surface having a radius of curvature substantially equal to the selected radius;
   d) pressing a dry coupling agent comprising an adhesive film onto the concave surface of the end piece; and
   e) pressing the adhesive-coated concave surface of the end piece onto the external surface of the pipe.

6. The method of claim 5 wherein the embedding step comprises casting the foam body around the stack.

7. The method of claim 5 wherein the embedding step comprises sub-steps of separately forming the stack and the foam body; forming a hole in the foam body; and inserting the stack into the hole.

8. The method of claim 5 wherein the step of pressing the adhesive film onto the end piece comprises pressing the film against an edge of the end piece so as to cut the film; and removing any adhesive that is not on the end piece.

9. The method of claim 5 wherein the adhesive film comprises an acrylic transfer film.

\* \* \* \* \*